United States Patent [19]
Hasegawa et al.

[11] Patent Number: 5,989,088
[45] Date of Patent: Nov. 23, 1999

[54] MANUFACTURING METHOD OF FLAT-PANEL DISPLAY UNIT, DISPLAY PANEL CARRIER THEREFOR AND MANUFACTURING METHOD OF ELECTRONIC DEVICE OR OPTICAL DEVICE

[75] Inventors: Tatsuya Hasegawa; Satoshi Yoshimura; Shinichi Koyama; Keizo Tanaka; Yoshikazu Yomogihara; Sanae Tokunaga; Masaichi Okubo, all of Tokyo, Japan

[73] Assignee: Kabushiki Kaisha Toshiba, Kawasaki, Japan

[21] Appl. No.: 08/887,338

[22] Filed: Jul. 2, 1997

[30] Foreign Application Priority Data

Jul. 3, 1996 [JP] Japan ................................. 8-173742
  Oct. 9, 1996 [JP] Japan ................................. 8-268569

[51] Int. Cl.⁶ ............................................... G02F 1/00
[52] U.S. Cl. ........................... 445/24; 445/63; 445/67; 29/430; 29/465; 29/466
[58] Field of Search ................. 445/24, 65, 63, 445/67; 29/430, 464–468; 349/1

[56] References Cited

U.S. PATENT DOCUMENTS 4,776,080  10/1988  Christensen ............................. 29/430
5,375,003  12/1994  Hirai ....................................... 359/88

*Primary Examiner*—Sandra O'Shea
*Assistant Examiner*—Ismael Negron
*Attorney, Agent, or Firm*—Pillsbury Madison & Madison LLP

[57] ABSTRACT

The present invention provides a manufacturing method of a flat-panel display unit and a carrier therefor which make it unnecessary to implement alignment in each step, except for alignment which require higher precision, by performing the alignment in advance in the pre-stage of a series of steps. The present invention also provides a manufacturing method of a flat-panel display unit which allows alignment with accuracy of about 50 to 100 μm to be performed simply, reliably and quickly. According to the inventive manufacturing method, a display panel is mounted non-shiftably on the carrier and while being mounted thereon, is then carried between processing machines and is processed by the processing machines. In mounting the display panel on the carrier, it is aligned with the carrier in advance by visually aligning alignment marks thereof. In processing it by the processing machine, the carrier and the processing machine are put into a predetermined state in which they are aligned and thereby, the display panel is put into a state in which it is aligned with the processing machine.

18 Claims, 13 Drawing Sheets

MANUFACTURING METHOD OF FLAT-PANEL DISPLAY UNIT, DISPLAY PANEL CARRIER THEREFOR AND MANUFACTURING METHOD OF ELECTRONIC DEVICE OR OPTICAL DEVICE

BACKGROUND OF THE INVENTION

1. Field of the Invention

The present invention relates to a manufacturing method of a flat-panel display unit used for a note type personal computer, a TV monitor and the like and a display panel carrier therefor.

2. Description of Related Art

A conventional method and equipment for manufacturing a flat-panel display unit will be explained below based on FIGS. 11 through 14.

A display panel which constitutes a display area of the flat-panel display unit comprises a plurality of pixels, through which a level of transmission or reflection of light may be controlled in accordance to control made from the outside, between two insulating substrates. Electrode areas, color filters and others are formed on one side of each of the insulating substrates via a number of processes and then liquid crystal substance and others are sandwiched therebetween to form a cell structure, i.e. the display panel. Next, driving circuits and others are electrically connected to edge portions of the display panel further via a number of processes.

Thus, the display panel and the insulating substrates must be processed through the number of processes and by a number of processing machines in order to manufacture the flat-panel display unit.

At first, alignment of the display panel or the insulating substrate with a working section of the processing machine in the prior art technology will be explained below with reference to conceptual drawings in FIGS. 11 and 12. It is noted that the display panel will be assumed to be a liquid crystal cell in the explanation below.

FIG. 11 shows a step of rough alignment. A liquid crystal cell 101 is conveyed to a working stage 134 of the processing machine through a roller conveyor 102 or manually by an operator. At this time, the liquid crystal cell 101 is guided by guide rollers 132 and is pushed in until its outer edge abuts with guide pins 133. The rough alignment is conducted thus by the abutment. The alignment accuracy is as rough as about 0.3 mm or more. Even if the accuracy of the dimension of the guide pins and the abutment is improved, the dimensional accuracy of the glass substrates used in the liquid crystal cell 101 is dispersed. Further, the positional accuracy of the edge of the glass substrate with the electrode terminal is dispersed, so that it is difficult to align them with the higher accuracy. Further, there has been a problem that if the guide pin 133 is made of a relatively rigid material in order to maintain the dimensional accuracy, the edge of the glass substrate might be broken when it abuts with such a pin.

FIG. 12 shows a step of fine alignment. The fine alignment is implemented by means of an image processor provided with a CCD camera 106 and an NC (numeral control) table 103. The liquid crystal cell 101 having alignment marks 111 at corners thereof having nearly a rectangular shape is placed on the NC table. When the alignment mark 111 enters the field of view of the CCD camera 106, the image processor calculates a direction and distance of the misalignment and calculates motion of the NC table 103 necessary for the alignment. Thereby, the NC table 103 is driven by a motor driver 130 to align the liquid crystal cell 101. The use of two CCD cameras 106 allows finer alignment to be made and normally about 0.01 to 0.02 mm (10 to 20 µm) may be obtained readily. Even in the roughest case, about 0.05 mm (50 µm) of accuracy may be obtained readily. Such fine alignment is required in a TCP pre-bonding step described later for example.

In the prior art technology, there has been no simple method suited to the case when the required accuracy is 0.05 mm to 0.3 mm (e.g. an ACF heating step described later) and the use of the expensive image processor has required the excessive investment on the facility and disallowed easy change of the facility.

Next, a flow of prior art manufacturing steps of the flat-panel display unit will be explained below by exemplifying a series of steps for mounting TCPs (Tape Carrier Package, called also as TAB) on the liquid crystal cell. FIG. 13 is a flow chart thereof.

The TCP comprises a driving IC for supplying driving voltage and the like to the liquid crystal cell mounted on a flexible substrate.

The process for mounting the TCP on the liquid crystal cell comprises five steps of attaching an ACF (Anisotropic Conductive Film), heating the ACF, pre-bonding the TCP, post bonding the TCP and soldering a PCB (Printed Circuit Board) as shown in the figure and the above-mentioned rough alignment is carried out in each step. Because the liquid crystal cell is conveyed solely to the next machine between the steps by means of rubber rollers or manually, the aligning operation had to be carried out repeatedly.

There has been a problem as described later also in the aligning operation in the TCP pre-bonding step which requires the fine alignment within the five steps described above.

As shown in FIG. 14, the liquid crystal cell 101 is conveyed onto a cell mount 163 of a pre-bonding machine and the rough alignment is carried out at this time. The liquid crystal cell 101 is placed so as to protrude toward the front side from the cell mount 163 like a shelf. Two CCD cameras are set below the shelf portion and a light source 160 and two monitor displays 161 are provided behind the cell mount 163.

At first, it is determined by the monitor displays 161 whether terminals at both ends of an area where the TCP is to be mounted on the edge portion of the liquid crystal cell 101 enter the field of views of the two CCD cameras. When they do not enter the field of view, the rough alignment is repeated. Then, the terminals at the both ends are controlled so that they come around the center of the field of view of each CCD camera by a pitch feed plate 162 provided on the cell mount 163.

The TCP 113 is set at the edge of a TCP mounting arm 136 turnably attached on a NC table for TCP and is turned and conveyed to the edge of the liquid crystal cell 101. Next, the both ends of the TCP terminal section are positioned accurately with the terminals at both ends of the to-be-mounted area on the liquid crystal cell, where TCP is to be mounted, by the move of the NC table for TCP made through a command from the image processor. Then, after confirming by the monitor displays that the fine alignment has been implemented, a pressuring head is applied to a TCP press-bonding section.

Such alignment method has had a problem that the processing time is prolonged because the further alignment is implemented with respect to the respective liquid crystal cells 101 by the high functional machine having the accuracy in the level of 0.01 to 0.02 mm (10 to 20 µm), after the alignment in the level of 0.3 mm in the rough alignment described above. Further, the field of view of the CCD cameras of the accurate alignment unit must be large.

Further, because the rough alignment of the display panel with the working section of a processing machine needs to be repeatedly implemented in each step in the prior art technology described above, the processing steps and processing time increase that much.

Still more, because such complicated and expensive machine like the image processor has been used even when no such fine alignment is required, the facility cost related to the alignment has been excessive. When the image processor stops due to some trouble, it takes time to recover it and during that time, the flow of the manufacturing steps had to be stopped.

Further, because the rough alignment is made by abutting the outer edge of the display panel with the guide pins, there has been a case when the edge thereof is broken especially when the display panel is made of glass, increasing the production cost because it cannot be used again if it is broken. Further, because the conveyance needs to be stopped to change the guide rollers or setting of the width thereof when the width of the substrate is changed, it has been an obstacle in improving the productivity.

Accordingly, it is an object of the present invention to solve the aforementioned problems by providing a method and apparatuses for manufacturing a flat-panel display unit which allow the productivity to be improved and the investment on the facility to be suppressed low.

Further, it is an object of the present invention to provide a method which allows the production to be continuously carried out even when specifications of the substrate such as a width thereof is changed.

It is also an object of the present invention to provide a display panel carrier which allows the display panel or electrode substrates thereof to be conveyed safely and simply and the predetermined positional relationship in connection with alignment to be reproduced by fitting or abutting with a processing machine.

SUMMARY OF THE INVENTION

According to a manufacturing method of a flat-panel display unit having an electrode substrate described in claim 1, it comprises steps of mounting said electrode substrate on carrier means non-shiftably; setting said carrier means to a processing machine so as to adjust positional relationship between the electrode substrate and the processing machine; transporting said carrier means from said processing machine to another processing machine while said electrode substrate is mounted on said carrier means; and setting said carrier means to said another processing machine so as to adjust positional relationship between the electrode substrate and the another processing machine.

By arranging as described above, the electrode substrate may be conveyed readily and may be readily conveyed in and out of an electrode substrate working table of the processing machine. It also allows to prevent the electrode substrate from being damaged during the conveyance.

According to the manufacturing method of a flat-panel display unit described in claim 2, it further comprises a step of aligning said electrode substrate with said carrier means in a predetermined positional relationship before said mounting step; and in the manufacturing method, each of said processing machines is aligned with said carrier means to bring about an aligned positional relationship between said electrode substrate and each of said processing machines.

The above-mentioned arrangement eliminates the necessity of processing facilities and processing time which might otherwise be required when alignment needs to be carried out repeatedly. Accordingly, it allows the manufacturing time and the investment on the facility to be reduced.

According to the manufacturing method of a flat-panel display unit described in claim 3, the carrier means and each processing machine are put into a state in which they are aligned by fitting or abutting them in the manufacturing method described in claim 2.

The above-mentioned arrangement allows the alignment of the carrier means with the processing machine to be completed almost in the same time with the conveying operation.

According to the manufacturing method of a flat-panel display unit described in claim 4, the electrode substrate is mounted on the carrier means by vacuum chucks in the manufacturing method described in claim 3.

Because the electrode substrate may be removed very easily by using the vacuum chucks and may be fixed on the carrier means just by using the one side thereof, processing or inspection thereof may be performed by using the other whole face.

According to the manufacturing method of a flat-panel display unit described in claim 5, the carrier means comprises a mounting section for mounting the electrode substrate and clamping tools for pinching the electrode substrate together with the mounting section and the electrode substrate is mounted removably and non-shiftably on the carrier means by being clamped by the clamping tools.

According to the manufacturing method of a flat-panel display unit described in claim 6, the clamping is achieved by springs provided to the clamping tools.

By arranging as described above, no pipe of compressed air or vacuumed air nor electrical wiring cord needs to be connected to the carrier. Therefore, the carrier may be moved freely without being restricted by such pipe or wiring cord.

According to a manufacturing method of a flat-panel display unit having an electrode substrate described in claim 7, it comprises steps of setting an electrode substrate on an electrode substrate mounting stage which is capable to attach to a processing machine; aligning alignment marks of said electrode substrate and said substrate mounting stage, which alignment marks are provided at predetermined positions of said electrode substrate and an electrode substrate mounting stage, so that said electrode substrate is aligned with said processing machine.

The above-mentioned arrangement allows the alignment of the display panel with accuracy of about 50 to 100 µm to be done simply, reliably and quickly.

According to the manufacturing method of a flat-panel display unit described in claim 8, alignment marks are provided at predetermined positions of the electrode substrate and an electrode substrate mounting stage and the electrode substrate is aligned with the carrier means by aligning the indicated positions of the both alignment marks under direct eye-observation.

According to the manufacturing method of a flat-panel display unit described in claim 9, at least a part of the electrode substrate mounting stage is at least a part of the carrier means.

The above-mentioned arrangement allows the electrode substrate to be mounted readily while keeping the aligned positional relationship and the process to be shifted from the aligning operation to the conveying operation.

According to the manufacturing method of a flat-panel display unit described in claim 10, the electrode substrate is made of a light transmitting material and the alignment mark on the electrode substrate is aligned with the alignment mark on the mounting stage by moving the electrode substrate horizontally with respect to the electrode substrate mounting stage.

According to the manufacturing method of a flat-panel display unit described in claim 11, the electrode substrate includes electrode terminals and the electrode terminals, and the alignment mark are made of an opaque material formed in the same step.

According to a carrier of a display panel or an electrode substrate thereof used in manufacturing a flat-panel display unit described in claim 12, it comprises a mounting and holding section for mounting the electrode substrate removably and non-shiftably after aligning the carrier with the electrode substrate; and a fitting and abutting section for putting the electrode substrate in a state in which it is aligned with a processing machine by fitting or abutting with the processing machine in a step in which they need to be aligned.

According to the carrier described in claim 13, the mounting and holding section is provided with vacuum chucks in the carrier described in claim 12.

According to the carrier described in claim 14, the vacuum chucks are provided within a mounting section for mounting the electrode substrate to suction the electrode substrate from the below thereof.

According to the carrier described in claim 15, the mounting and holding section comprises a mounting section for mounting the electrode substrate; and clamping tools for pinching the electrode substrate together with the mounting section.

According to the carrier described in claim 16, handles are provided to grab and carry the carrier by hands.

According to a manufacturing method of an electronic device or an optical device described in claim 17, it comprises steps of aligning said electronic device or optical device with a carrier means in a predetermined positional relationship; mounting said electrode substrate on said carrier means non-shiftably after said aligning step; setting said carrier means to a processing machine so as to adjust positional relationship between the electrode substrate and the processing machine; transporting said carrier means from said processing machine to another processing machine while said electrode substrate is mounted on said carrier means; and setting said carrier means to said another processing machine so as to adjust positional relationship between the electrode substrate and the another processing machine; and in the manufacturing method, each of said processing machines is aligned with said carrier means to bring about an aligned positional relationship between said electrode substrate and each of said processing machines.

According to the manufacturing method of the electronic device or optical device described in claim 18, the carrier means comprises a mounting section for mounting the electrode substrate and clamping tools for pinching the electrode substrate together with the mounting section and the electrode substrate is mounted removably and non-shiftably on the carrier means by being clamped by the clamping tools.

The specific nature of the invention, as well as other objects, uses and advantages thereof, will clearly appear from the following description and from the accompanying drawings in which like numerals refer to like parts.

DESCRIPTION OF PREFERRED EMBODIMENTS

A first embodiment of the present invention will be explained below with reference to FIGS. 1 through 7.

Figure 1:
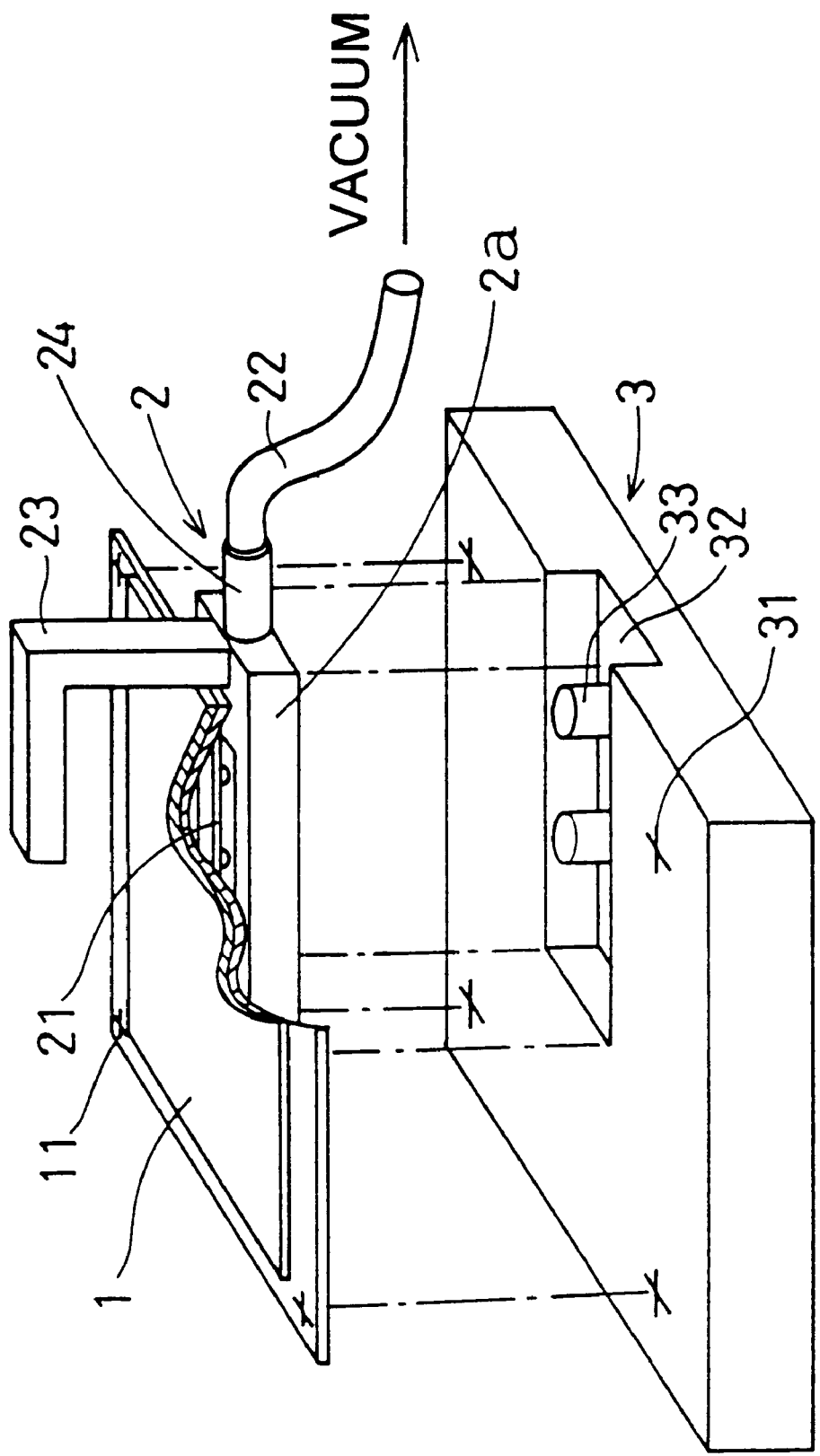
FIG. 1 is a perspective view showing a carrier and an aligning stage according to a first embodiment of the present invention.

FIG. 1 shows a carrier 2 of a liquid crystal cell 1 and an aligning stage 3 of the present embodiment.

The liquid crystal cell 1 having nearly a rectangular shape has nearly cruciform alignment marks 11 having a length of 1 mm at four corners thereof. Because the alignment mark 11 is made of a metallic thin film which does not transmit light and which has been formed by the same mask with that used in forming electrode terminals in the electrode substrate of the liquid crystal cell 1, its positional relationship with the electrode terminal is accurate and is fixed. Although the cruciform alignment mark has been used in the present embodiment, various marks may be used.

The carrier 2 has a mounting section 2a formed of a flat rectangular parallelepiped and a flexible vacuum pipe 22 is connected to one side of the mounting section 2a via a connection port 24. A plurality of vacuum chucks 21 are created on the upper face of the mounting section 2a to suction and fix the liquid crystal cell 1 on the upper face of the mounting section 2a by suction force from the vacuum pipe 22. A handle 23 having a shape of reversed L is projected from the end of the upper face of the mounting section 2a to allow an operator to carry the carrier 2 by hand.

The aligning stage 3 is made from nearly a rectangular thick plate whose lengthwise and breathwise sizes are larger than those of the liquid crystal cell 1 and alignment marks 31 which are black rings of 1.2 mm in diameter and whose inner part is colored white for example are embedded on the upper face thereof corresponding to the alignment mark 11 of the liquid crystal cell 1. Although the alignment mark 31 is ringed here taking the relationship with the alignment mark 11, the working accuracy and the readiness of the alignment into consideration, various shapes of marks may be used in connection with the alignment mark 11 and it may be colored variously so as to be able to obtain high contrast.

Then, a flat face which has a carrier receiving section 32 which fits with the outer face of the carrier 2 and stores the carrier 2 and where the upper face of the carrier 2 continues to the upper face of the aligning stage 3 when the carrier 2 is fitted as such is created. In order to assure the engagement of the carrier 2 with the aligning stage 3 further, two cylindrical projections 33 are provided at the bottom of the carrier receiving section 32 and two cylindrical concave sections 24 that fit with the projections 33 are provided at the corresponding bottom of the carrier 2.

An operation of aligning the liquid crystal cell 1, the aligning stage 3 and the carrier 2 of the present embodiment will be explained below with reference to FIGS. 2 and 3.

Figure 2:
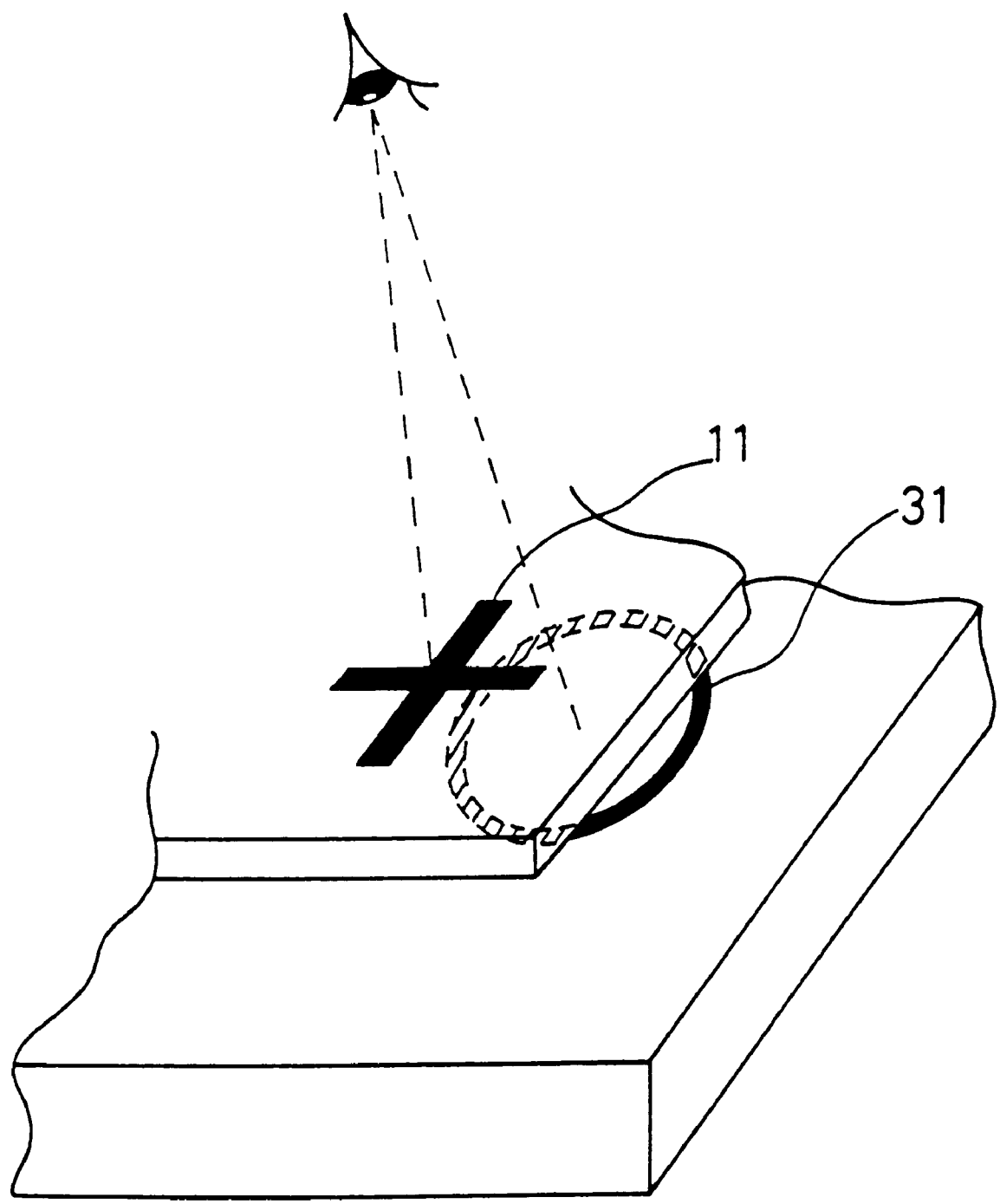
FIG. 2 is a perspective view schematically showing an alignment step of alignment marks.
Figure 3:
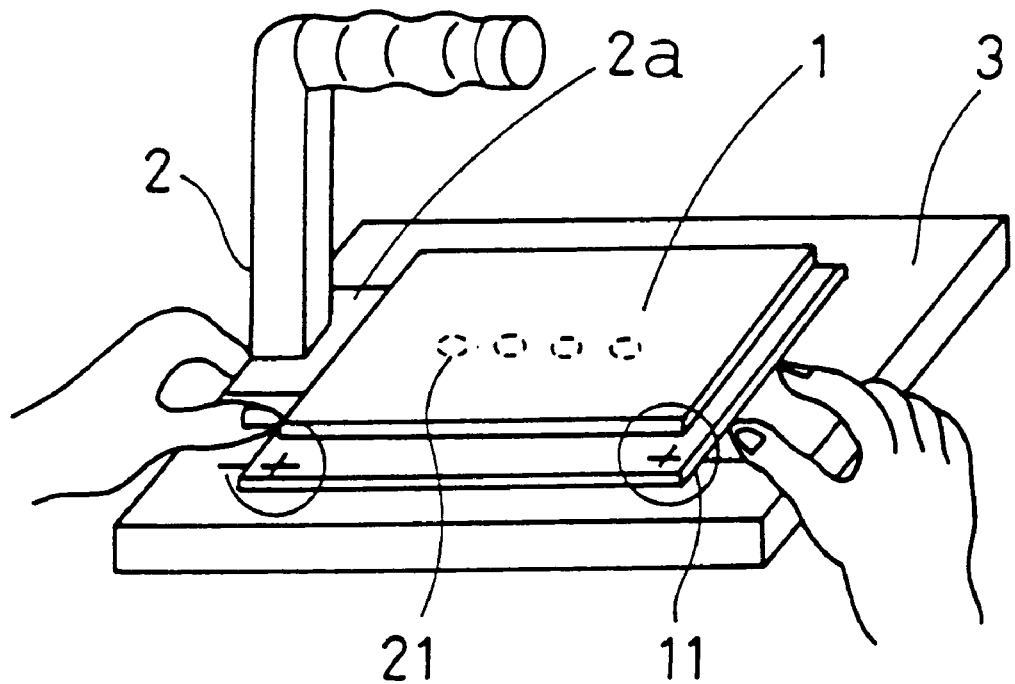
FIG. 3 is a perspective view schematically showing an aligning operation of a liquid crystal cell on the aligning stage.

At first, an operator places the liquid crystal cell 1 on the upper face of the aligning stage 3 in which the carrier 2 has been fitted and which is almost horizontal and visually confirms the position of the alignment mark 11 of the liquid crystal cell 1 and that of the alignment mark 31 of the aligning stage 3 to perceive any misalignment thereof (FIG. 2). Because the liquid crystal cell 1 is clear, the alignment mark 11 is opaque and the alignment mark 31 is colored white within the black ring and is marked clearly with the good contrast colors, the operator can perceive the misalignment readily. Then, the operator corrects the position of the liquid crystal cell 1 quickly by the both hands so that the alignment mark 11 comes within the alignment mark 31. An operator who has gone through a training of several hours can perform the aligning operation with accuracy of 0.05 to 0.07 mm (50 to 70 $\mu$m), or even 0.03 mm (30 $\mu$m), within a working time of about 1 to 3 seconds.

The aligning method described above allows the alignment to be quickly achieved with the accuracy of 50 to 100 $\mu$m by using the inexpensive and reliable apparatus without using the expensive and complicated apparatus used in the fine alignment.

Although the alignment marks are preferred to have the colors and shapes described above, they may have a shape suitable for indexing the position such as a combination of wedge type shapes and may be colored in other colors having a strong contrast such as dark blue.

After completing the alignment described above, the vacuum mechanism of the carrier 2 is actuated immediately to fix the liquid crystal cell 1 on the mounting section 2a of the carrier 2 by the vacuum chucks 21. Then, the operator grabs the handle 23 in this state to carry the carrier 2 on which the liquid crystal cell 1 has been placed to a processing machine.

Figure 4:
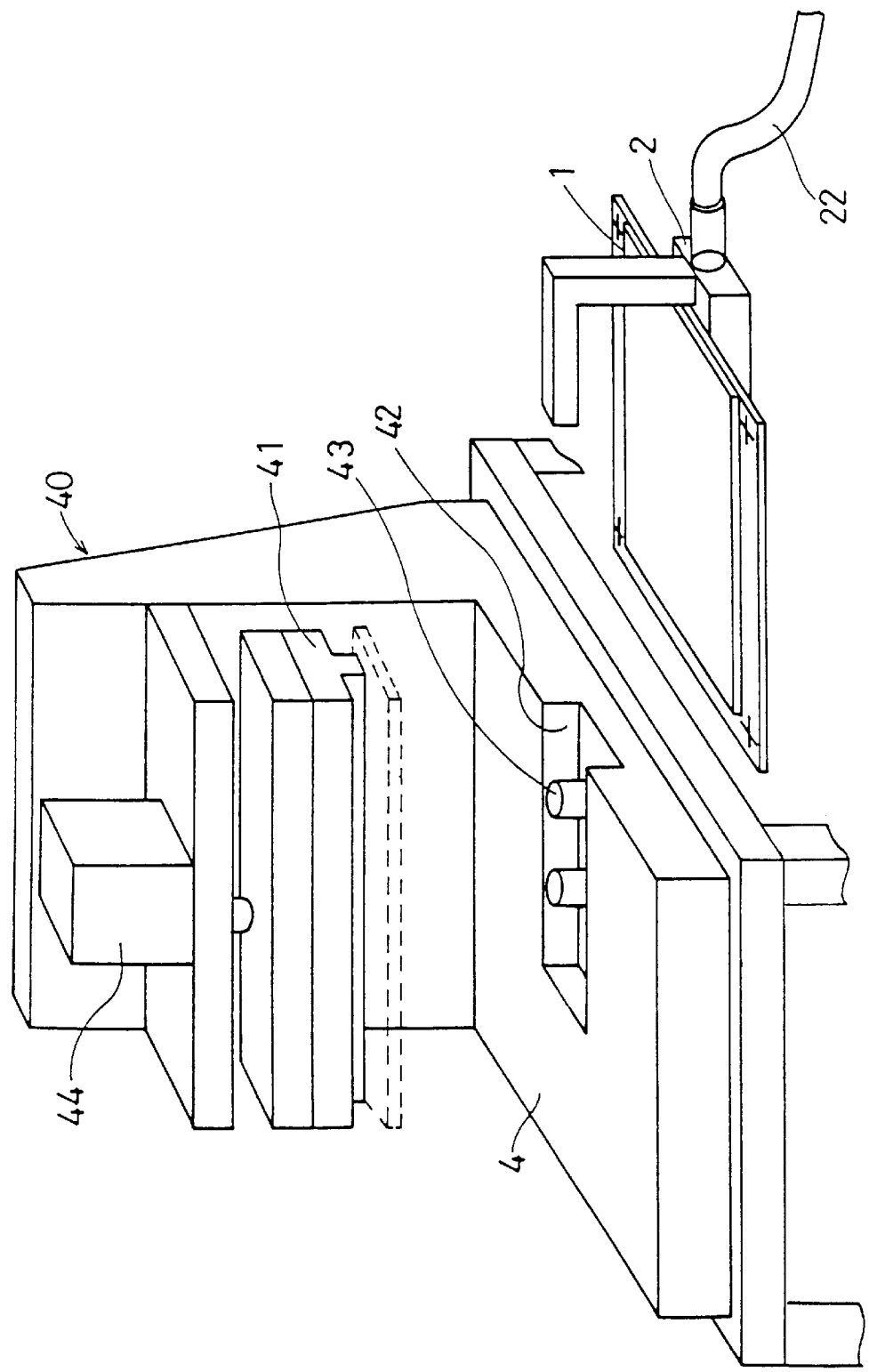
FIG. 4 is a perspective view schematically showing the conveyance and disposition of the liquid crystal cell to a processing machine.

As shown in an example in FIG. 4, the upper face of a cell stage 4 of the processing machine 40 is formed to be congruent with the shape of the upper face of the aligning stage 3 and engages with the carrier 2, which has been carried thereto, by a receiving section 42 and columnar projections 43. Because the positional relationship between the liquid crystal cell 1 and the carrier 2 is kept in the same state when the above-mentioned alignment has been done, the liquid crystal cell 1 on the carrier 2 is placed at a predetermined position on the cell stage 4 when the carrier 2 is inserted to the cell stage 4 of the processing machine 40. That is, the liquid crystal cell 1 is put in the state in which it is aligned with the processing machine 40 (with accuracy of 50 to 100 $\mu$m).

Figure 5:
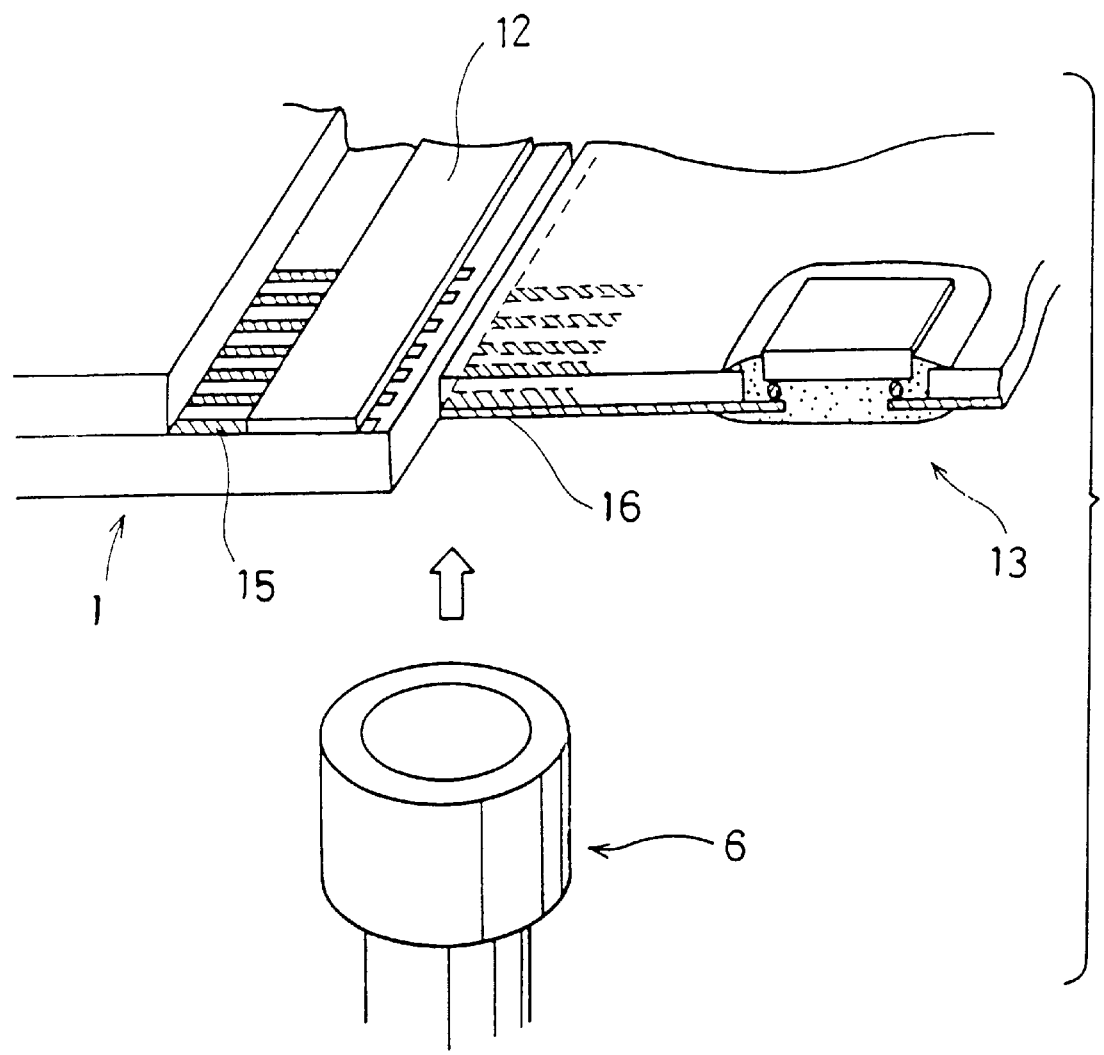
FIG. 5 is a perspective view schematically showing a fine alignment step in a TCP pre-bonding step.

Such alignment will be explained as a preliminary alignment carried out before the fine alignment for the TCP pre-bonding step with reference to FIG. 5. Because the alignment with the accuracy of 50 to 100 $\mu$m has been already done, both ends of a terminal group 15 of the liquid crystal cell 1 will not deviate out of the field of view of a CCD camera 6 and the alignment may be performed quickly that much because it is not necessary to align the liquid crystal cell 1 with the cell stage 4 by using the CCD camera or the like. The fine alignment of the both terminal groups 15 and 16 will be done after conveying a TCP 13 by a TCP arm.

Figure 6:
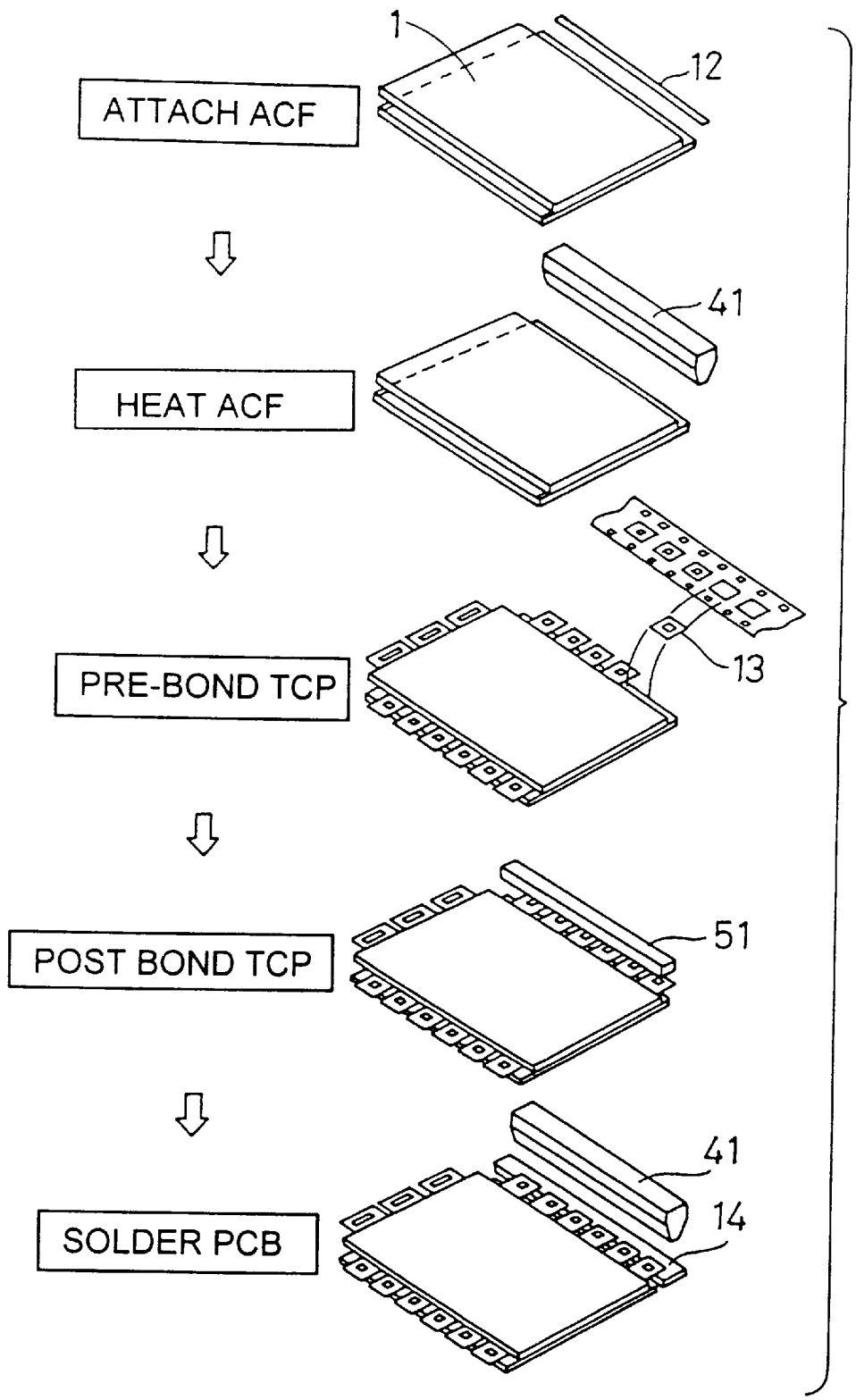
FIG. 6 is a schematic drawings conceptually showing a series of steps for mounting and connecting the TCP to the liquid crystal cell.

Next, production steps of the flat-panel display unit of the present embodiment will be explained by exemplifying a series of steps for mounting the TCP on the display panel. FIG. 6 is a schematic drawings conceptually showing the series of steps.

After the rough alignment, a tape-like ACF (Anisotropic Conductive Film) 12 is attached on a connecting terminal section on the upper face of the edge of the liquid crystal cell 1 in Step 1. Then, the ACF 12 is heated by abutting a heater tool 41 in Step 2. The TCP 13 is pre-bonded and then post bonded in Steps 3 and 4. The pre-bonding is carried out by means of a simple pressuring head and the permanent press-bonding is carried out by means of a heater tool 51 which is controlled by pulse current. Finally, the TCP 13 is soldered with a driver PCB 14 by heat-pressing by the other heater tool 41 in Step 5. The ECB 14 is applied with solder as pre-solder in advance.

Figure 7:
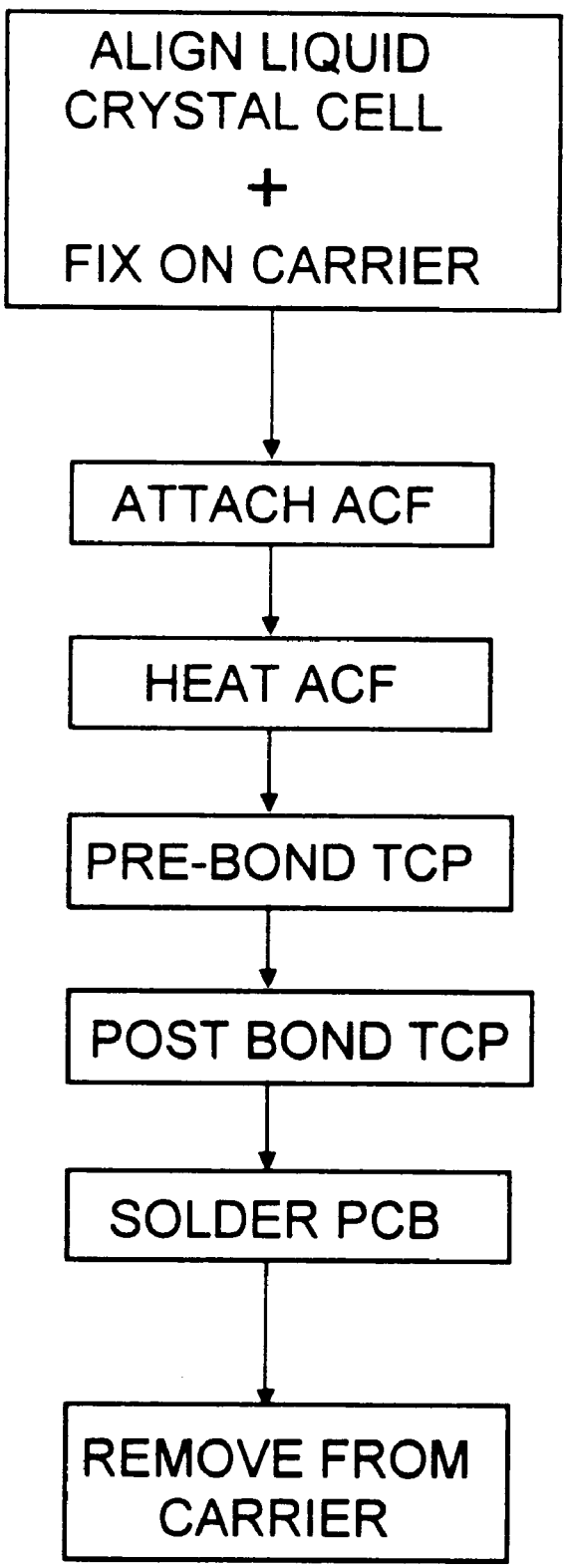
FIG. 7 is a flow chart of the series of steps for mounting and connecting the TCP in the present embodiment.

FIG. 7 is a flow chart of the above-mentioned series of the steps of the present embodiment.

The above-mentioned aligning operation of the present embodiment is performed in the pre-stage of the five steps described above and no similar alignment is performed in each step of attaching and heating the ACF, pre- and post bonding the TCP and soldering with the PCB. The fine alignment by means of the image processor and the NC table is performed only in the steps of pre-bonding the TCP and soldering the PCB. The liquid crystal cell is removed out of the carrier after going through the series of steps.

According to the manufacturing method of the present embodiment, the aligning operation needs to be done only in the pre-stage of the series of steps and no alignment other than the fine alignment needs to be done in each step. Therefore, the present invention allows the machines and time for the series of steps to be saved as compared to the prior art technology in which the aligning operation in the almost same accuracy is repeatedly performed.

The present embodiment also allows a lighting test of the pixels of the liquid crystal cell to be performed while mounting on the carrier provided that the carrier is made of a transparent material.

While the alignment has been carried out under direct eye-observation by touching and shifting the position in the present embodiment, it is possible to carry it out under the observation of a stereoscopic microscope or by means of a movable stage provided with press and position controls of a micrometer type spiral pressing mechanism, in accordance with a required accuracy and a skill level of an operator. While an automatic alignment unit may be also used, the present embodiment is advantageous over the prior art method in which the automatic alignment unit is repeatedly used because it needs to be used only once for the series of steps also in this case.

Figure 8:
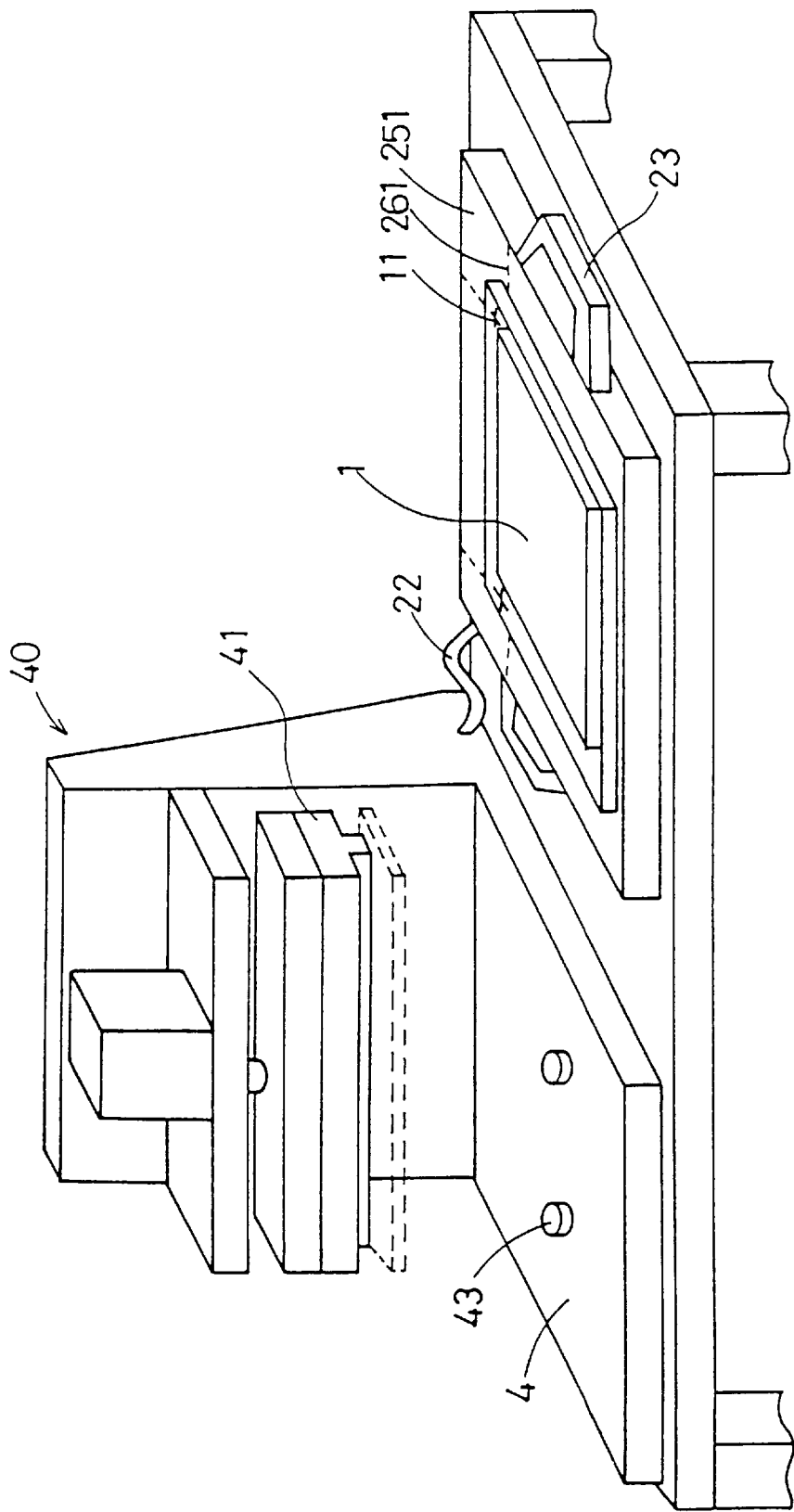
FIG. 8 is a perspective view schematically showing alignment of the liquid crystal cell to the processing machine according to a first modified embodiment.

FIG. 8 shows a first modified embodiment in which the shape of the carrier 2 and the cell stage is different. A table on which the processing machine 40 for heating ACF is mounted extends toward the right side in the figure to create an alignment work space. Placed on the work space is a carrier board 251 which functions also as an aligning stage. The carrier board 251 is provided with vacuum chucks at the upper face thereof and is connected with the vacuum pipe 22 from the processing machine 40. Similarly to the above-mentioned embodiment, the vacuum chucks are activated when the alignment marks 11 of the liquid crystal cell 1 is aligned with alignment marks 261 of the carrier board 251. Handles 23 are provided at the right and left ends of the carrier board 251 to allow the operator to pick up by both hands. The carrier board 251 is also provided, at the bottom thereof, with columnar concave sections which fit with right and left columnar projections 43 provided on the cell stage 4 of the processing machine 40.

Although the carrier board 251 is drawn as if it is attached to the processing machine 40 in FIG. 8, the carrier board 251 may be used throughout the series of steps similarly to the above-mentioned embodiment.

This modified embodiment also allows the alignment to be performed simply, reliably and quickly.

Figure 9:
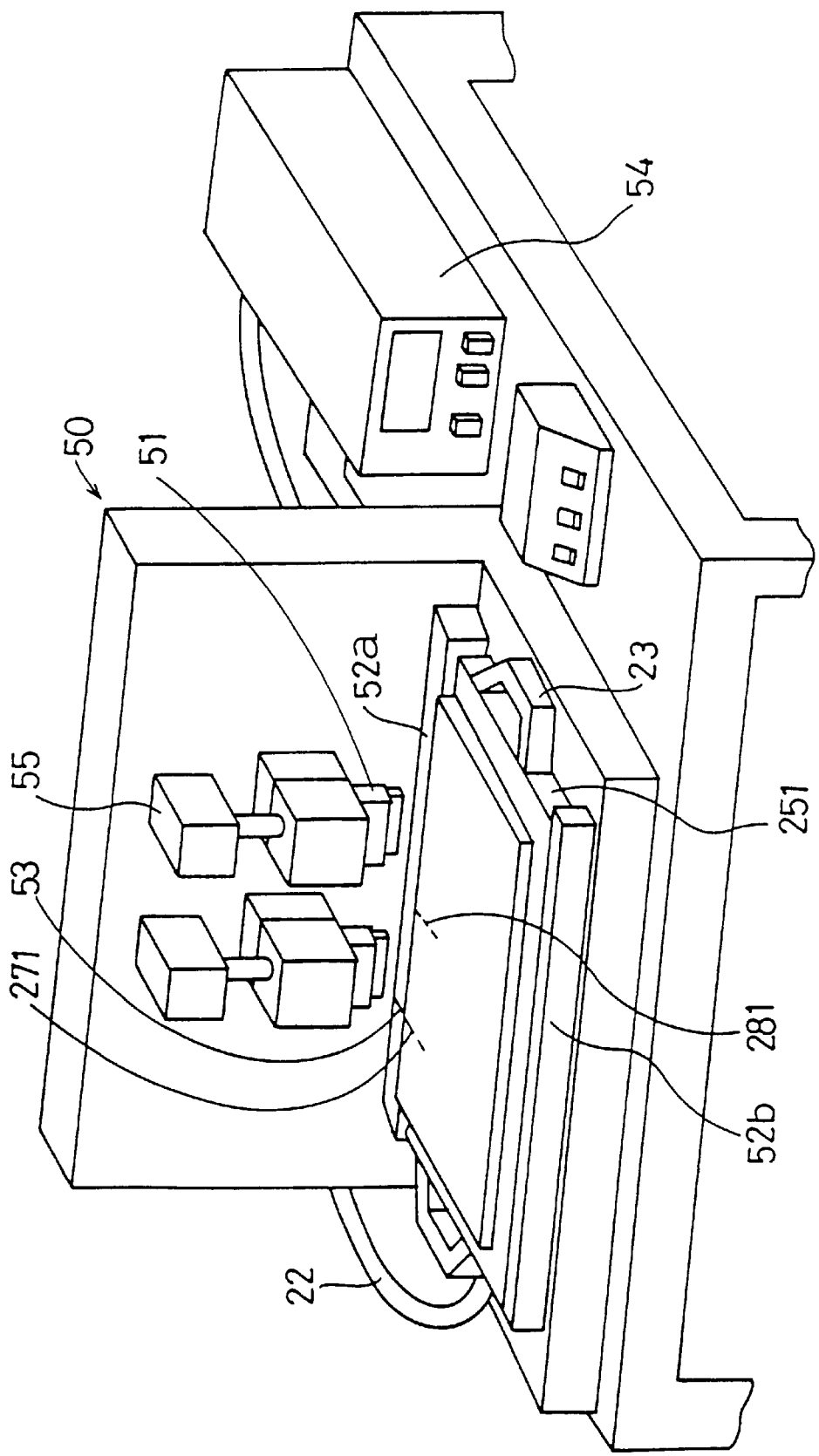
FIG. 9 is a perspective view schematically showing alignment of the liquid crystal cell to the processing machine according to a second modified embodiment.

FIG. 9 shows a second modified embodiment. Instead of providing the fitting projections 43 on the cell stage 4 like the first modified embodiment, guide rails 52a and 52b are provided at the both front and rear ends of the stage and an alignment line 53 is drawn on the guide rail 52a at the rear end, i.e. at the working site. While the carrier board 251 of this modified embodiment is similar to that of the first modified embodiment, the accuracy of the front and rear end faces is taken instead of providing the fitting concave sections at the bottom thereof and an alignment line 271 is drawn at the upper face of the rear edge portion thereof.

The carrier board 251 on which the liquid crystal cell 1 is being fixedly mounted in the aligned state is set between the guide rails 52a and 52b. Then, the alignment lines 271 and 53 on the guide rail side and the carrier board side, respectively, are aligned each other. This modified embodiment also allows the alignment to be performed simply, reliably and quickly almost similarly to the first embodiment and the first modified embodiment.

It is noted that while the machine shown in FIG. 9 is a TCP post bonding machine 50 and a pressuring head 51 equipped with a cylinder 55 and a pulse power supply 54 are drawn, just second and third alignment lines 281 need to be provided on the carrier board 251 when the press-bonding needs to be done by a plural times by shifting the position of the pressuring head 51 with respect to the liquid crystal cell 1.

It is also possible to arrange such that the guide rails are extended to pre- and post-processing machines to guide and convey the carrier board 251 between the processing machines.

Figure 10:
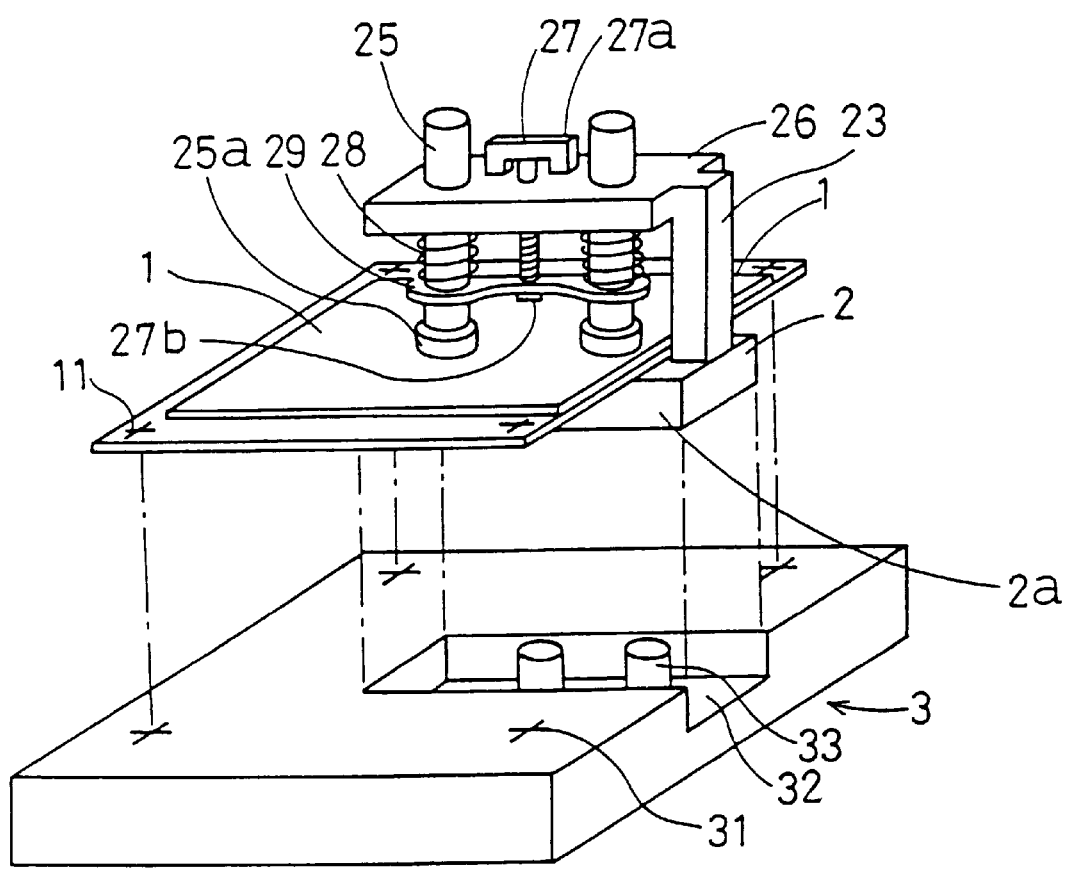
FIG. 10 is a perspective view showing a carrier and an aligning stage according to a second embodiment of the present invention.
Figure 11:
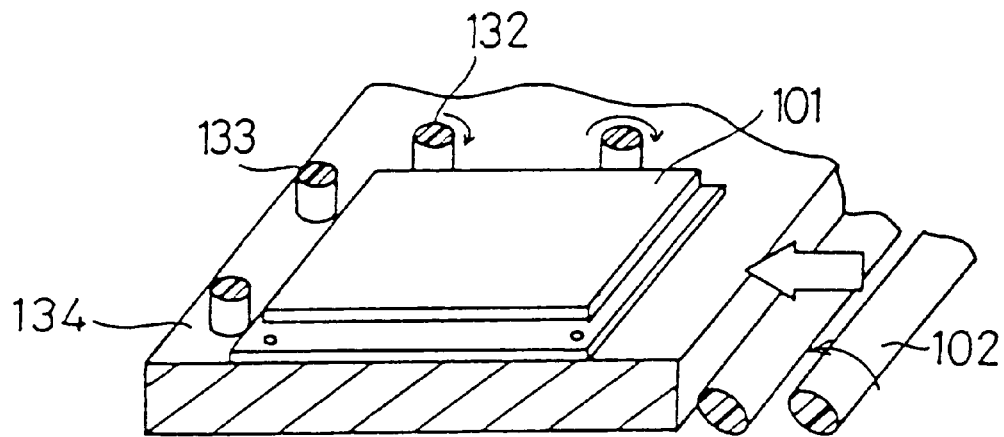
FIG. 11 is a perspective view schematically showing rough alignment of a liquid crystal cell according to the prior art technology.
Figure 12:
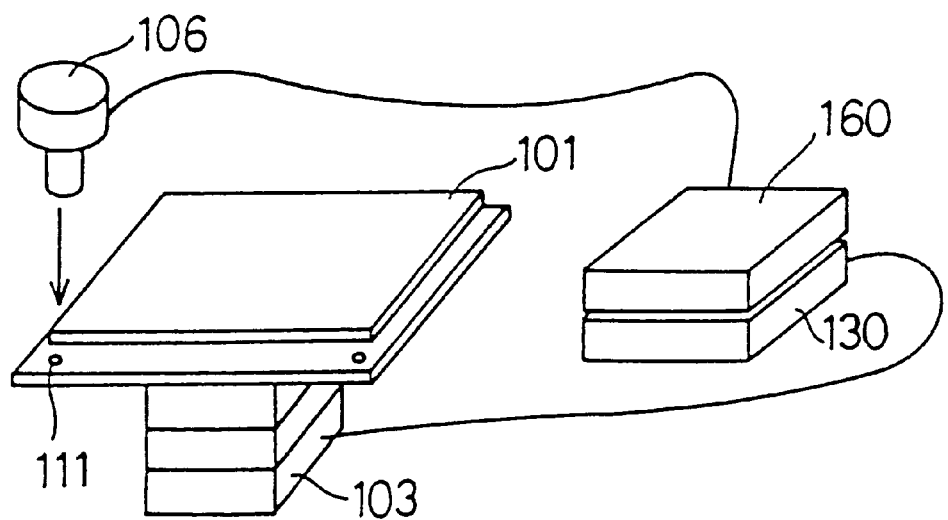
FIG. 12 is a perspective view schematically showing fine alignment of the liquid crystal cell according to the prior art technology.
Figure 13:
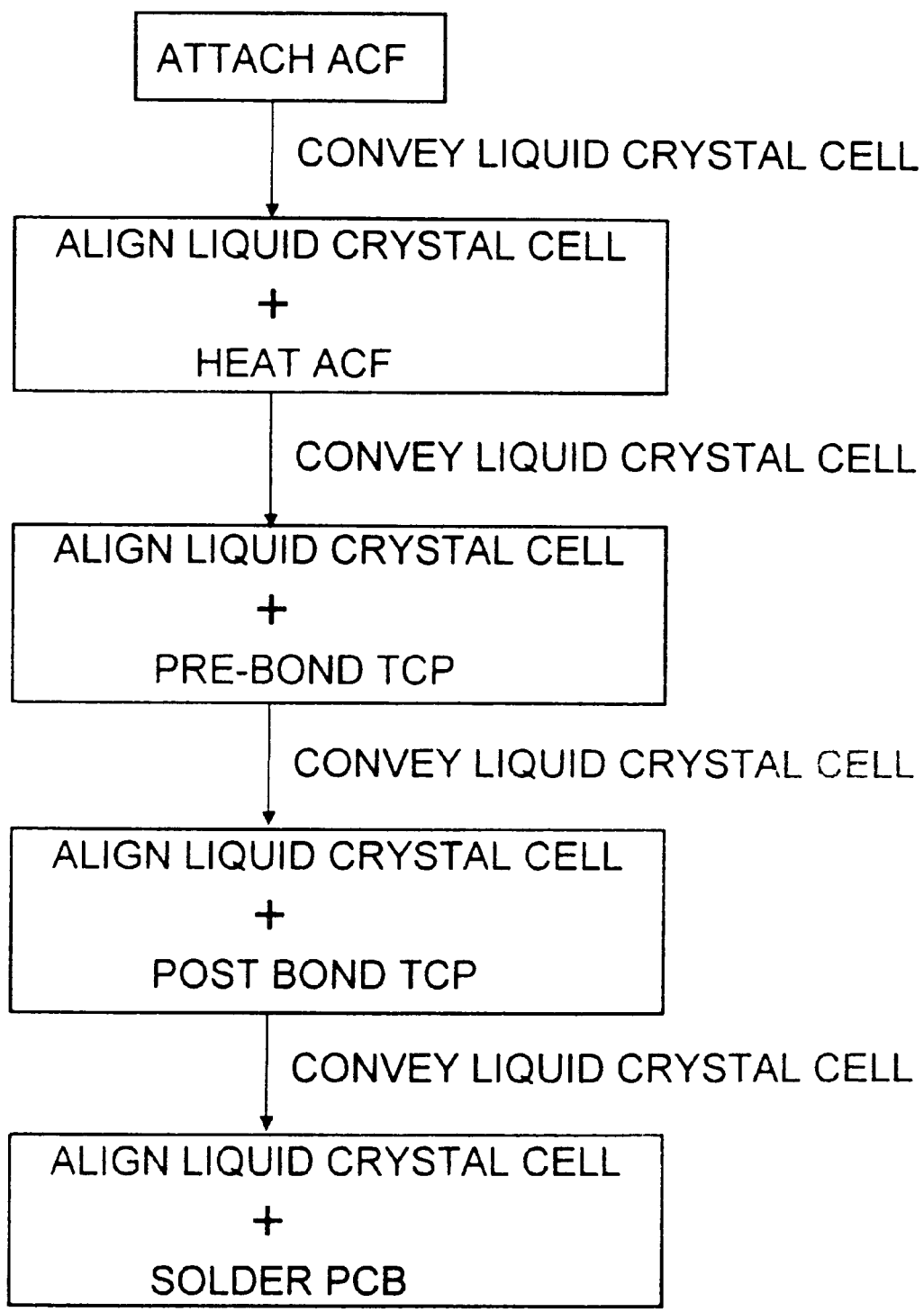
FIG. 13 is a flow chart of the series of steps for mounting and connecting the TCP according the prior art technology.
Figure 14:
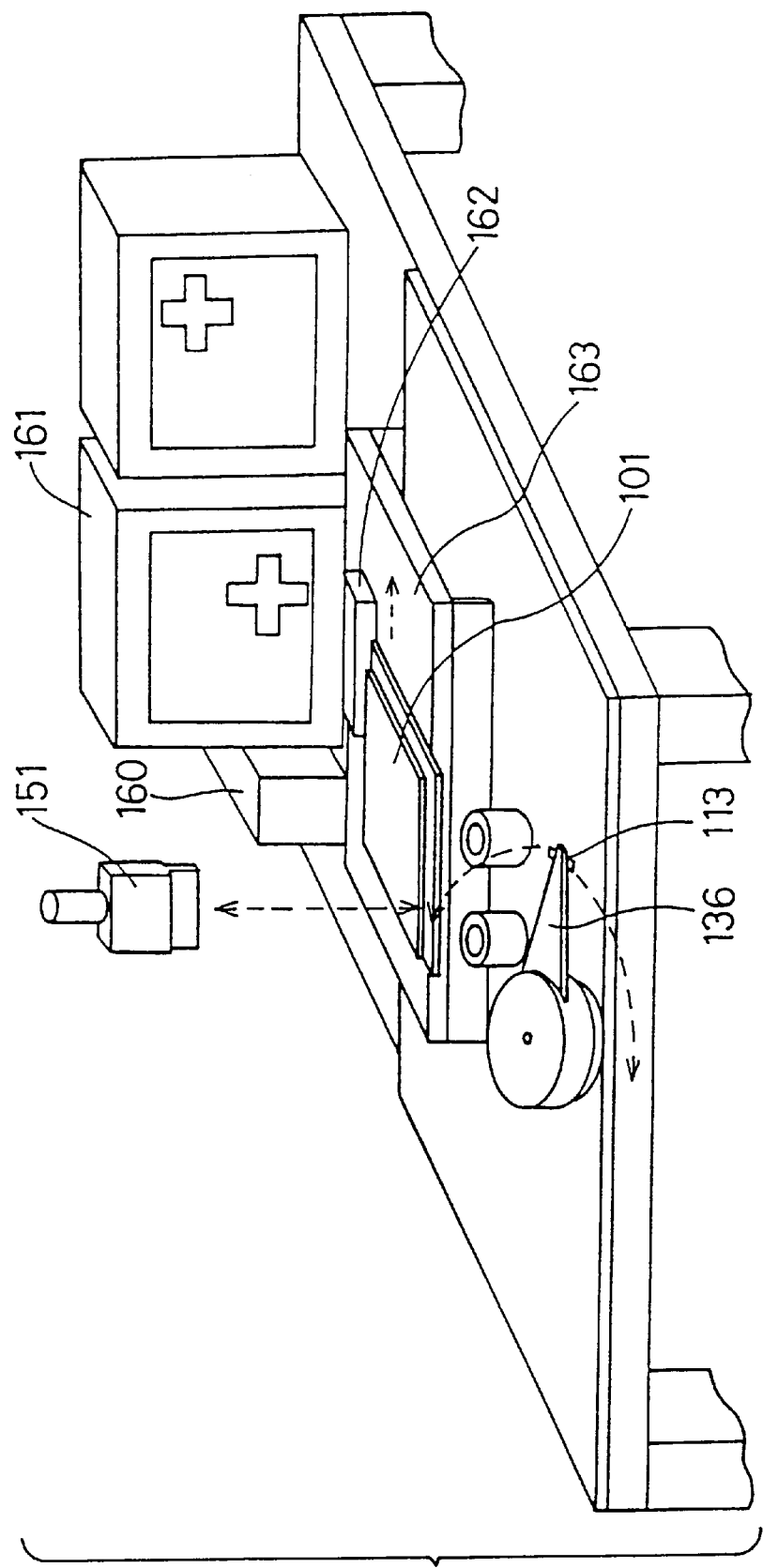
FIG. 14 is a perspective view schematically showing the TCP pre-bonding step.

A second embodiment of the present invention will be explained with reference to FIG. 10. In the present embodiment, one as shown in FIG. 10 is used as the carrier 2 in the same arrangement with the first embodiment.

The carrier 2 of the present embodiment comprises a mounting section 2a formed of a flat rectangular parallelepiped and a clamp rod holding member 26 which projects in the shape of reversed L from the upper face of the end of the mounting section 2a. The clamp rod holding member 26 is provided with two vertical clamp rods 25 for clamping the liquid crystal cell 1 mounted on the mounting section 2a from the above to pinch the liquid crystal cell 1 together with the mounting section 2a. The upper part of the clamp rod 25 vertically arranged is inserted through a through hole at the horizontal part of the clamp rod holding member 26 and is guided so as to be movable in the vertical direction. The lower part of the two clamp rods 25 penetrate through one horizontal plate 29. The horizontal plate 29 and the clamp rods 25 are connected so as not to be movable in the vertical direction from each other. A coil spring 28 is wound around the clamp rods 25 and is held while being compressed between the horizontal part of the clamp rod holding member 26 and the horizontal plate 29. The clamp rod 25 is urged downward from the clamp rod holding member 26 by the coil spring 28 and clamps the liquid crystal cell 1 mounted on the mounting section 2a from the top. A rubber sheet is attached to the lower face 25a of the clamp rod 25 to prevent the liquid crystal cell 1 from being damaged and shifted horizontally.

A bolt 27 which is inserted through a screw hole provided on the clamp rod holding member 26 and a hole provided on the horizontal plate 29 is disposed at the position nearly equally distant from the two clamp rods 25. The bolt 27 plays a role of bringing up the clamp rods 25, i.e. of releasing the liquid crystal cell 1 from the clamped state. A turning lever 27a is provided at the upper end of the bolt 27 to turn the bolt 27 by hand. A flange 27b is attached to the portion of the bolt 27 at the lower end thereof which protrudes downward from the horizontal plate 27. When the bolt 27 is brought up by turning the turning lever 27a, the upper face of the flange 27b abuts with the lower face of the horizontal plate 29. When the bolt 27 is brought down by turning the turning lever 27a in the opposite direction, the abutment of the flange portion 27b at the lower end of the bolt with the horizontal plate 29 is eliminated and urging force of the coil spring 28 acts on the liquid crystal cell 1, putting it in the clamped state. The vertical portion of the clamp rod holding member 26 functions also as a handle 23 and allows the operator to carry the carrier 2 by hand.

After completing the aligning operation, the turning lever 27a of the carrier 2 is turned immediately to bring down the clamp rods 25. Thereby, the clamp rods 25 clamp the liquid crystal cell 1 by the urging force of the coil springs 28 and fix the liquid crystal cell 1 on the mounting section 2a of the carrier 2.

Because the clamping for preventing misalignment is implemented by the urging force of the coil spring in the present embodiment, no pipe for compressed air or vacuumed air nor electrical wiring cord needs to be connected to the carrier. Accordingly, the carrier may be moved freely without being restricted by such pipe or wiring cord and may be stored freely on a shelf for temporary storage or in a box for carriage.

Further, the pressure for clamping the liquid crystal cell will not vary depending on operators or number of times of works and may be always fixed by appropriately setting the spring. Accordingly, it assures the reliability in preventing misalignment and prevents the liquid crystal cell from being damaged by excessive clamping force.

Although the clamping for pinching the liquid crystal cell and the release thereof have been carried out by turning the bolt in the present embodiment, they may be carried out by means of a long lever and an anchor thereof.

Further, it is also possible to use a pneumatic spring, instead of the mechanical spring, to clamp and release the liquid crystal cell by using a driving cylinder actuated by compressed air.

A handle, having an adequate shape, for carrying the carrier 2 may be attached to the mounting section 2a or the clamp rod holding member 26 separately.

While preferred embodiments have been described, variations thereto will occur to those skilled in the art within the scope of the present inventive concepts which are delineated by the following claims.

What is claimed is:

1. A manufacturing method of a flat-panel display unit having an electrode substrate, comprising steps of:
    mounting said electrode substrate on carrier means non-shiftably;
    setting said carrier means to a processing machine so as to adjust positional relationship between the electrode substrate and the processing machine;
    transporting said carrier means from said processing machine to another processing machine while said electrode substrate is mounted on said carrier means; and
    setting said carrier means to said another processing machine so as to adjust positional relationship between the electrode substrate and the another processing machine.

2. The manufacturing method of a flat-panel display unit according to claim 1,
    further comprising a step of aligning said electrode substrate with said carrier means in a predetermined positional relationship before said mounting step;
    wherein each of said processing machines is aligned with said carrier means to bring about an aligned positional relationship between said electrode substrate and each of said processing machines.

3. The manufacturing method of a flat-panel display unit according to claim 2, wherein said carrier means and each of said processing machine are put into a state in which they are aligned by fitting or abutting them.

4. The manufacturing method of a flat-panel display unit according to claim 3, wherein said electrode substrate is mounted on said carrier means by means of vacuum chucks.

5. The manufacturing method of a flat-panel display unit according to claim 3, wherein said carrier means comprises a mounting section for mounting said electrode substrate and clamping tools for pinching said electrode substrate together with said mounting section and said electrode substrate is mounted removably and non-shiftably on said carrier means by being clamped by said clamping tools.

6. The manufacturing method of a flat-panel display unit according to claim 5, wherein said clamping is achieved by springs provided to said clamping tools.

7. A manufacturing method of a flat-panel display unit having an electrode substrate, comprising steps of:
    setting an electrode substrate on an electrode substrate mounting stage which is capable to attach to a processing machine;
    aligning alignment marks of said electrode substrate and said substrate mounting stage, which alignment marks are provided at predetermined positions of said electrode substrate and an electrode substrate mounting stage, so that said electrode substrate is aligned with said processing machine.

8. The manufacturing method of a flat-panel display unit according to claim 2, wherein alignment marks are provided at predetermined positions of said electrode substrate and an electrode substrate mounting stage and said electrode substrate is aligned with said carrier means by aligning the indicated positions of said both alignment marks under direct eye-observation.

9. The manufacturing method of a flat-panel display unit according to claim 8, wherein at least a part of said electrode substrate mounting stage is at least a part of said carrier means.

10. The manufacturing method of a flat-panel display unit according to claim 7 or 8, wherein said electrode substrate is made of a light transmitting material and said alignment mark on said electrode substrate is aligned with said alignment mark on said mounting stage by moving said electrode substrate horizontally with respect to said electrode substrate mounting stage.

11. The manufacturing method of a flat-panel display unit according to claim 7, wherein said electrode substrate includes electrode terminals, and said electrode terminals and said alignment mark are made of an opaque material formed in the same step.

12. A carrier of a display panel or an electrode substrate thereof used in manufacturing a flat-panel display unit, comprising:
    a mounting and holding section for mounting said electrode substrate removably and non-shiftably after aligning said carrier with said electrode substrate; and
    a fitting and abutting section for putting said electrode substrate in a state in which it is aligned with a processing machine by fitting or abutting with said processing machine in a step in which they need to be aligned.

13. The carrier according to claim 12, wherein said mounting and holding section is provided with vacuum chucks.

14. The carrier according to claim 13, wherein said vacuum chucks are provided within a mounting section for mounting said electrode substrate to suction said electrode substrate from the below thereof.

15. The carrier according to claim 12, wherein said mounting and holding section comprises:
    a mounting section for mounting said electrode substrate; and
    clamping tools for pinching said electrode substrate together with said mounting section.

16. The carrier according to claim 12, wherein handles are provided to grab and carry said carrier by hands.

17. A manufacturing method of an electronic device or an optical device, comprising the steps of:
    aligning said electronic device or optical device with a carrier means in a predetermined positional relationship;

mounting said electronic device or optical device on said carrier means non-shiftably after said aligning step;

setting said carrier means to a processing machine so as to adjust a positional relationship between the electronic device or optical device and the processing machine;

transporting said carrier means from said processing machine to another processing machine while said electronic device or optical device is mounted on said carrier means; and setting said carrier means to said another processing machine so as to adjust a positional relationship between the electronic device or optical device and said another processing machine, wherein each of said processing machines is aligned with said carrier means to bring about an aligned positional relationship between said electronic device or optical device and each of said processing machines.

18. The manufacturing method of the electronic device or optical device according to claim 17, wherein said carrier means comprises a mounting section for mounting said electronic device or optical device and clamping tools for pinching said electronic device or optical device together with said mounting sections and said electronic device or optical device is mounted removably and non-shiftably on said carrier means by being clamped by said clamping tools.

* * * * *